Oct. 17, 1939.    M. F. JOHNSON    2,176,260
EXPANSION PLUG
Filed June 27, 1938
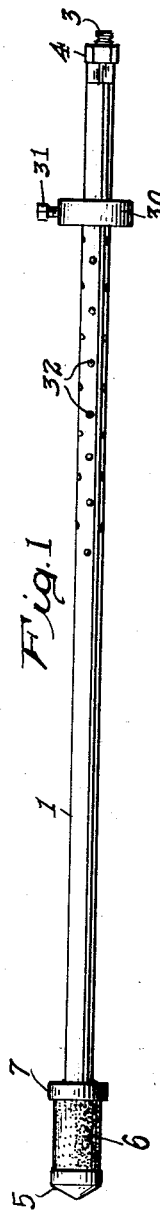
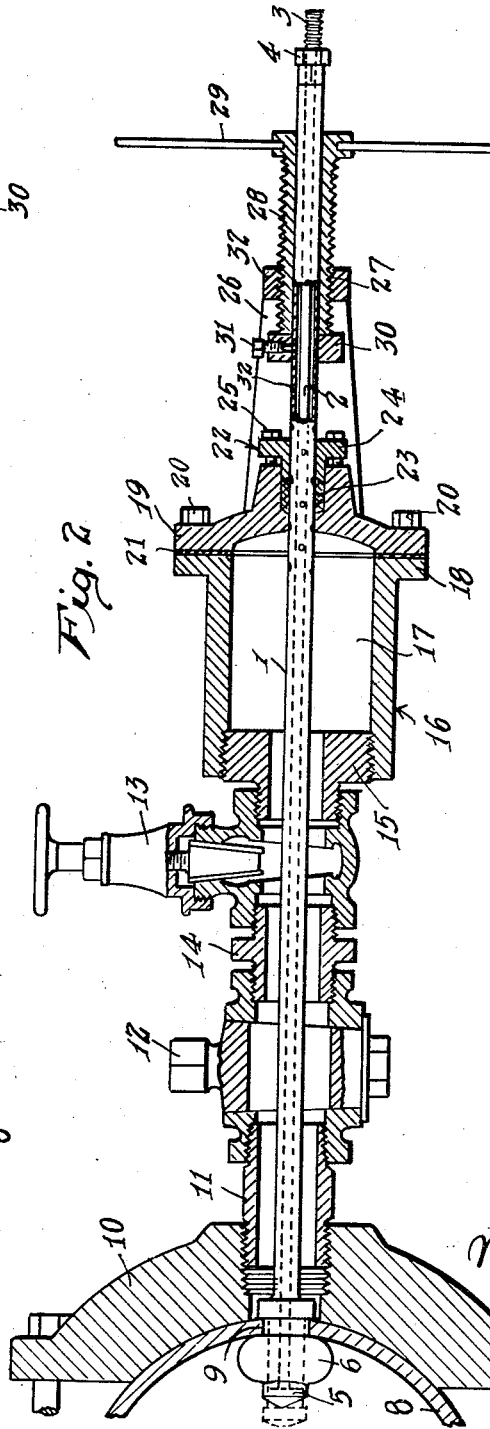
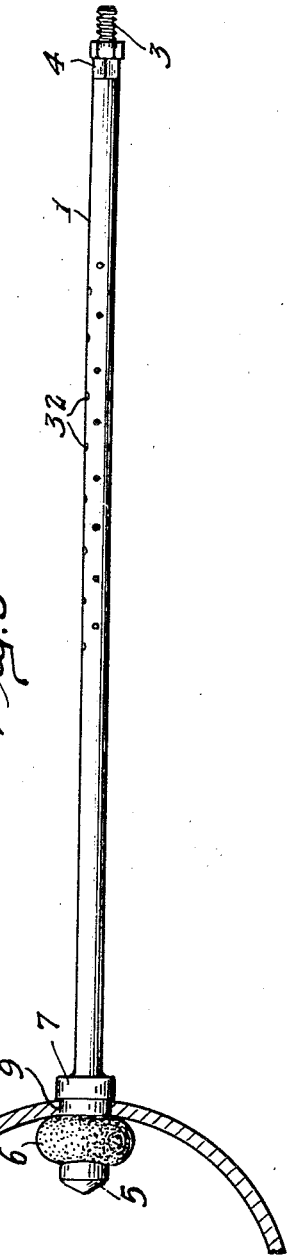
Inventor
Melvin F. Johnson
By Lyon Lyon
Attorneys Patented Oct. 17, 1939

2,176,260

UNITED STATES PATENT OFFICE 2,176,260

EXPANSION PLUG

Melvin F. Johnson, Los Angeles, Calif.

Application June 27, 1938, Serial No. 216,021

1 Claim. (Cl. 29—84)

This invention relates to a device adapted to be inserted in water mains and the like to permit repair to the service lines without shutting down the main.

It has hitherto been necessary in the maintenance of water supply, particularly in large cities, to shut off the main supply whenever repairs are required in and around the service connections with the main. This entails an interruption of service to a large portion of the city besides that portion immediately concerned with the particular service connection.

Various expedients have been resorted to in an attempt to overcome this difficulty, such as the abandonment of the entire service connection with its valves and fittings and blocking the whole off by a cement encasement.

It is one object of the present invention to provide means whereby service connection repairs and replacements may be made on the mains without the necessity of shutting down the main.

It is a further object of this invention to provide means whereby an expansion plug may be inserted into the aperture in the main, and fixed thereto, thereby sealing the service connections from the water or other fluid and permitting the removal, repair or replacement thereof.

It is a further object of this invention to provide a device of the class described capable of accommodating various sizes of plugs adapted to seal off various sizes of service connections in the main.

Other objects of this invention will appear hereinafter.

Figure 1 is an elevation showing a device embodying my invention.

Figure 2 is an elevation partly in section showing an embodiment of my invention as used in connection with a conventional tapping machine.

Figure 3 is an elevation partly in section showing an embodiment of my invention in use upon a main after most of the service connections have been removed.

Referring more particularly to the drawing, my invention consists of an outer hollow shaft 1 through which passes an inner shaft 2, threaded at 3 and carrying a nut 4 upon one end thereof. Upon the opposite end of shaft 2 there is provided a cap 5 engaging expansible rubber plug 6. Upon the end of shaft 1 there is a cup 7 which serves to engage and support the plug 6 together with the cap 5. The plug 6 may be of any convenient size and it is contemplated that various sizes of plugs 6 may be used in connection with the shafts 1 and 2. The shaft 2 passes through a hole in plug 6 and is connected at one end thereof with the cap 5. The plug 6 may be changed from its elongated position, as shown in Fig. 1, to its expanded position, as shown in Fig. 3, by turning the nut 4 and drawing the shaft 2 through shaft 1 so that cap 5 approaches cup 7. A collar 30 carrying a key 31 slides upon shaft 1 in such manner that the key 31 may be secured in any one of the holes 32 in shaft 1.

Referring more particularly to Fig. 2, there is shown a main 8 with an aperture 9 therein around which is shown clamp 10. Inserted in clamp 10 is shown a nipple 11 threaded into curb-cock 12. A valve 13 is illustrated connected to curb-cock 12 by an adapter 14; and an adapter 15 joins valve 13 to tapping machine 16. This tapping machine 16 is shown here as consisting of a hollow casting 17 bearing a flange 18, and a head 19 joined to casting 17 by bolts 20. A gasket 21 may be provided by the head 19 and casting 17. A packing gland 22 is shown formed on the head 19 in which is a packing 23 held in place by packing bonnet 24 which is in turn secured to head 19 by the bolts 25.

Two arms 26 extend from the head 19 and carry an internally threaded member 27 adapted to receive a threaded shaft 28. One end of the threaded shaft 28 carries the handle 29 and the other end of the threaded shaft 28 may abut upon a collar 30. The collar 30 carries a key 31 and is slidable upon shaft 1 to a position wherein the key 31 may be secured in one of the holes 32 in the shaft 1.

The operation of the invention is as follows. With the valve 13 closed, all of the fittings between the valve 13 and the service are disconnected and the adapter 15 and tapping machine 16 are connected. The valve 13 is then opened. If the passage in curb-cock 12 is too small to permit the passage of plug 6, it is first tapped out to a larger size. Then with the shafts 1 and 2 and the plug 6 inserted in the tapping machine 16, the handles 29 are turned, which forces the shafts 1 and 2 and plug 6, which is now in its elongated position, through the connections due to the pressure exerted by threaded shaft 28 upon the collar 30 which is keyed by means of key 31 to a suitable hole 32 in the shaft 1. In such manner the plug 6 passes through valve 13, curb-cock 12 and into position lying within aperture 9. The operator then takes several turns upon nut 4, causing plug 6 to expand and seal aperture 9 as its shown in Fig. 3. With the aperture 9 thus sealed, any repairs or replacements desired upon the service connection may be made, and if desired the aperture 9 may be tapped out to larger size and a permanent plug placed therein, while salvage of all the service connections is accomplished.

While the particular forms of the invention herein described are well adapted to carry out the objects of the invention, it is to be understood that various modifications and changes may be made without departing from the principles of the invention, and the invention includes all such modifications and changes as come within the scope of the appended claim.

I claim:

An apparatus comprising an outer shaft bearing a series of holes therein, an inner shaft within said outer shaft, an expansible rubber member one end of which is carried by said outer shaft and the other end of which is carried by said inner shaft, means for bringing the ends of said outer and said inner shafts towards each other whereby said rubber member is expanded, a collar upon said outer shaft, a key in said collar adapted to register with any one of said holes in said outer shaft, and means bearing upon said collar for forcing said shafts and said plug into an aperture to be sealed against the pressure of the fluid in the service connections of a water system.

MELVIN F. JOHNSON.